(12) United States Patent
Malm

(10) Patent No.: US 10,920,682 B2
(45) Date of Patent: Feb. 16, 2021

(54) INTAKE AIR ASSESSMENT FOR INDUSTRIAL ENGINES

(71) Applicant: REM Technology Inc., Calgary (CA)

(72) Inventor: Howard Malm, Coquitlam (CA)

(73) Assignee: REM TECHNOLOGY INC., Calgary (CA)

( * ) Notice: Subject to any disclaimer, the term of this patent is extended or adjusted under 35 U.S.C. 154(b) by 0 days.

(21) Appl. No.: 16/673,070

(22) Filed: Nov. 4, 2019

(65) Prior Publication Data

US 2020/0141340 A1    May 7, 2020

Related U.S. Application Data

(60) Provisional application No. 62/755,023, filed on Nov. 2, 2018.

(51) Int. Cl.
| | |
|---|---|
| *F02D 19/02* | (2006.01) |
| *F02D 41/18* | (2006.01) |
| *F02D 41/00* | (2006.01) |
| *F02D 19/06* | (2006.01) |

(Continued)

(52) U.S. Cl.
CPC ......... *F02D 19/029* (2013.01); *F02D 19/026* (2013.01); *F02D 19/027* (2013.01); *F02D 19/0647* (2013.01); *F02D 19/087* (2013.01); *F02D 19/10* (2013.01); *F02D 41/0025* (2013.01); *F02D 41/0027* (2013.01); *F02D 41/182* (2013.01); *F02D 41/004* (2013.01); *F02D 41/0045* (2013.01); *F02D 2200/0406* (2013.01); *F02D 2200/0414* (2013.01); *F02D 2200/0602* (2013.01); *F02D 2200/0606* (2013.01); *F02D 2200/0616* (2013.01); *F02D 2200/0816* (2013.01)

(58) Field of Classification Search
None
See application file for complete search history.

(56) References Cited

U.S. PATENT DOCUMENTS

| | | | |
|---|---|---|---|
| 7,363,883 B2* | 4/2008 | Ito | F02M 21/0278 123/3 |
| 7,587,999 B2* | 9/2009 | Ito | F02M 21/0215 123/3 |

(Continued)

OTHER PUBLICATIONS

EPA Method 19, https://www.epa.gov/sites/production/files/2017-08/documents/method_19.pdf, 15 pages (Aug. 3, 2017).

(Continued)

*Primary Examiner* — Kevin R Steckbauer
(74) *Attorney, Agent, or Firm* — Thompson Hine LLP

(57) ABSTRACT

The present disclosure relates to assessing the intake air flow of industrial engines. For an industrial engine that receives vent gas added to intake air for combustion, a gas concentration sensor is used to measure a concentration of a particular gas, e.g. methane, in the intake air. An amount of the methane component in the intake air flowing to the engine that was added by the vent gas can be determined from the measured concentration of methane in the intake air and a flow rate of the intake air. The intake air flow rate may be directly measured, or calculated using instrumentation which may already be in place for engine air-to-fuel ratio control.

20 Claims, 5 Drawing Sheets

(51) Int. Cl.
*F02D 19/08* (2006.01)
*F02D 19/10* (2006.01)

(56) References Cited

U.S. PATENT DOCUMENTS

| | | | | |
|---|---|---|---|---|
| 7,801,668 B2* | 9/2010 | Ito | ........................ | F02M 69/045 |
| | | | | 701/108 |
| 8,113,181 B2* | 2/2012 | Malm | ................ | F02M 21/0215 |
| | | | | 123/527 |
| 8,235,029 B2* | 8/2012 | Malm | ..................... | F23G 7/065 |
| | | | | 123/531 |
| 8,382,469 B2* | 2/2013 | Malm | ................ | F02M 21/0227 |
| | | | | 431/5 |
| 8,851,054 B2* | 10/2014 | Malm | ................ | F02M 21/0215 |
| | | | | 123/527 |
| 8,973,361 B2* | 3/2015 | Shimizu | ................ | F02B 37/001 |
| | | | | 60/611 |
| 8,978,627 B2* | 3/2015 | Malm | .................... | F02B 43/12 |
| | | | | 123/527 |
| 9,086,022 B2* | 7/2015 | Shimizu | ................ | F02D 19/027 |
| 9,217,398 B2* | 12/2015 | Nishio | ................... | F02D 19/027 |
| 9,261,034 B2* | 2/2016 | Ishida | ................... | F02D 19/029 |
| 9,267,425 B2* | 2/2016 | Suzuki | .................... | F02B 37/12 |
| 9,534,564 B2* | 1/2017 | Malm | ................... | F02M 55/007 |
| 10,161,306 B2* | 12/2018 | Malm | ..................... | F02B 43/00 |
| 2005/0205022 A1* | 9/2005 | Ito | ........................ | F02D 19/023 |
| | | | | 123/27 GE |
| 2006/0204909 A1* | 9/2006 | Malm | ........................ | F02C 3/22 |
| | | | | 431/12 |
| 2008/0127950 A1* | 6/2008 | Malm | ................... | F02D 19/081 |
| | | | | 123/527 |
| 2008/0147303 A1* | 6/2008 | Ito | ........................ | F02D 19/0623 |
| | | | | 701/111 |
| 2008/0162335 A1* | 7/2008 | Ito | ........................ | F02M 21/0278 |
| | | | | 705/37 |
| 2011/0094593 A1* | 4/2011 | Malm | ..................... | F23G 7/065 |
| | | | | 137/2 |
| 2012/0180766 A1* | 7/2012 | Malm | ................ | F02M 21/0215 |
| | | | | 123/518 |
| 2013/0055712 A1* | 3/2013 | Shimizu | .................. | F02D 29/06 |
| | | | | 60/602 |
| 2013/0067913 A1* | 3/2013 | Nishio | .................... | F02B 37/00 |
| | | | | 60/599 |
| 2013/0101401 A1* | 4/2013 | Shimizu | .................... | F02C 7/28 |
| | | | | 415/175 |
| 2013/0174800 A1* | 7/2013 | Malm | ........................ | F02C 3/22 |
| | | | | 123/1 A |
| 2014/0000255 A1* | 1/2014 | Suzuki | ............... | F02M 21/0215 |
| | | | | 60/599 |
| 2014/0298818 A1* | 10/2014 | Kurosaka | ................ | F23L 15/04 |
| | | | | 60/776 |
| 2015/0176534 A1* | 6/2015 | Malm | ..................... | F23N 1/025 |
| | | | | 123/445 |
| 2017/0074183 A1* | 3/2017 | Howard | .................. | F02B 37/02 |
| 2020/0141340 A1* | 5/2020 | Malm | .................. | F02D 41/004 |

OTHER PUBLICATIONS

Brettschneider, J. "Extension of the Equation for the Calculation of the Air-Fuel Equivalence Ratio" SAE Technical paper 972989, 15 pages (1997).

Alberta Protocol for Engine Fuel Efficiency and Vent Gas Capture, Specified Gas Emitters Regulation, Version 1, https://open.alberta.ca/publications/9780778567880, 97 pages (Oct. 2009).

* cited by examiner

INTAKE AIR ASSESSMENT FOR INDUSTRIAL ENGINES

CROSS-REFERENCE TO RELATED APPLICATIONS

The present non-provisional application claims priority to U.S. Provisional Application No. 62/755,023 filed Nov. 2, 2018, the entirety of which is incorporated herein by reference.

TECHNICAL FIELD

The present disclosure relates to assessing the intake air flow of industrial engines and more specifically to determining an amount of methane supplied to the engine that has been introduced to the intake air as vent gas.

BACKGROUND

In a carbureted or fuel injected internal combustion engine combustible gases from low pressure or atmospheric hydrocarbon vent sources may be introduced to the intake air and used as fuel by the engine. If the engine is not scavenged (i.e. the use of intake air to sweep the exhaust gases from an engine cylinder after the completion of the power stroke) or has relatively little scavenging, a high fraction of the introduced vent gases is combusted in the engine and thereby converted mainly to water and carbon dioxide.

For example, with SlipStream® technology (SlipStream® is a registered trademark owned by REM Technology Inc.) combustible gases from vent sources, such as for example in petroleum extraction process, are introduced to the air intake of an internal combustion engine. For example, U.S. Pat. No. 9,534,564 to Maim and assigned to REM Technology Inc., the entire content of which is incorporated by reference herein, describes a system and method for controlling a flow of vent gases to a natural gas engine. In the SlipStream® system, the vent gas replaces part of the engine fuel thus reducing the fuel used from the normal source. If the vent gas contains methane, a potent greenhouse gas, the combustion of the methane reduces the atmospheric effect of the otherwise vented methane. According to the International Panel on Climate Change, IPCC, on a mass basis methane has some 25 times the effect of carbon dioxide on the global warming potential over a 100 year period. Accordingly, the process of adding vent gas to intake air not only reduces the need for the main engine fuel but significantly reduces the undesired greenhouse effects of the methane component of the otherwise vented vent gases. Furthermore, not only is reducing the amount of methane that is released to atmosphere good for the environment, but in jurisdictions that implement carbon taxes or a cap-and-trade type system there is financial incentive for the businesses as reducing their greenhouse gas emissions helps reduce the carbon tax that would have otherwise been paid and/or the business can sell their excess carbon credits.

Determination of the beneficial reduction amount of greenhouse gas, GHG, requires methane quantification measurements. In existing systems, the measurement requires the vent gas flow value and a composition analysis of the vent gases. The compositional analysis is performed by collecting a representative vent gas sample and having a laboratory analysis performed. Multiplication of the vent gas mass flow rate with methane mass fraction of the vent gas sources provides the required quantification provided the methane gas fraction is relatively constant over time.

However, such measurement method of the vent gas has deficiencies. The first deficiency of this method is the inability to adjust for changes in the vent gas composition between periodic collection of the vent gas samples. A second deficiency is that the manual collection of a gas sample is subject to undesired contamination or dilution due to human error. A third deficiency is the need for separate flow meters for dealing with vent gases from different sources and compositions such as from a compressor packing leak and engine crankcase gases.

Accordingly, an alternative and/or improved method for determining an amount of methane supplied to the engine as vent gas remains highly desirable.

SUMMARY

The present disclosure describes an intake air assessment for industrial engines that includes a method for determining an amount of methane supplied to an engine, which in an embodiment is an industrial engine. In an exemplary embodiment, a method is disclosed for assessing intake air flow to an industrial engine operating on a main fuel, the intake air including vent gases comprising methane produced by one or more vent sources. The method is executed by a processor, and includes receiving methane concentration data of a concentration of methane in the intake air as measured by a methane concentration sensor disposed at a location along an intake line prior to the intake air being mixed with main fuel; determining a flow rate of the intake air into the engine; and calculating an amount of methane in the intake air into the engine, a flow rate of methane calculated corresponding to methane introduced to the intake air by the vent gas.

In another embodiment, a system is disclosed for assessing intake air flow to an industrial engine operating on a main fuel, the intake air including vent gases comprising methane produced by one or more vent sources. The system includes a gas concentration sensor for measuring a concentration of methane in the intake air prior to mixing of the intake air and the main fuel; and a controller configured to receive gas concentration data from the gas concentration sensor, receive sensor data from one or more additional sensors associated with the engine, and calculate an amount of the methane in the intake air flowing into the engine.

Other objects and advantages of the disclosed intake air assessment for industrial engines will be apparent from the following description, the accompanying drawings, and the appended claims.

BRIEF DESCRIPTION OF THE DRAWINGS

Further features and advantages of the present disclosure will become apparent from the following detailed description, taken in combination with the appended drawings, in which.

DETAILED DESCRIPTION

Figure 1:
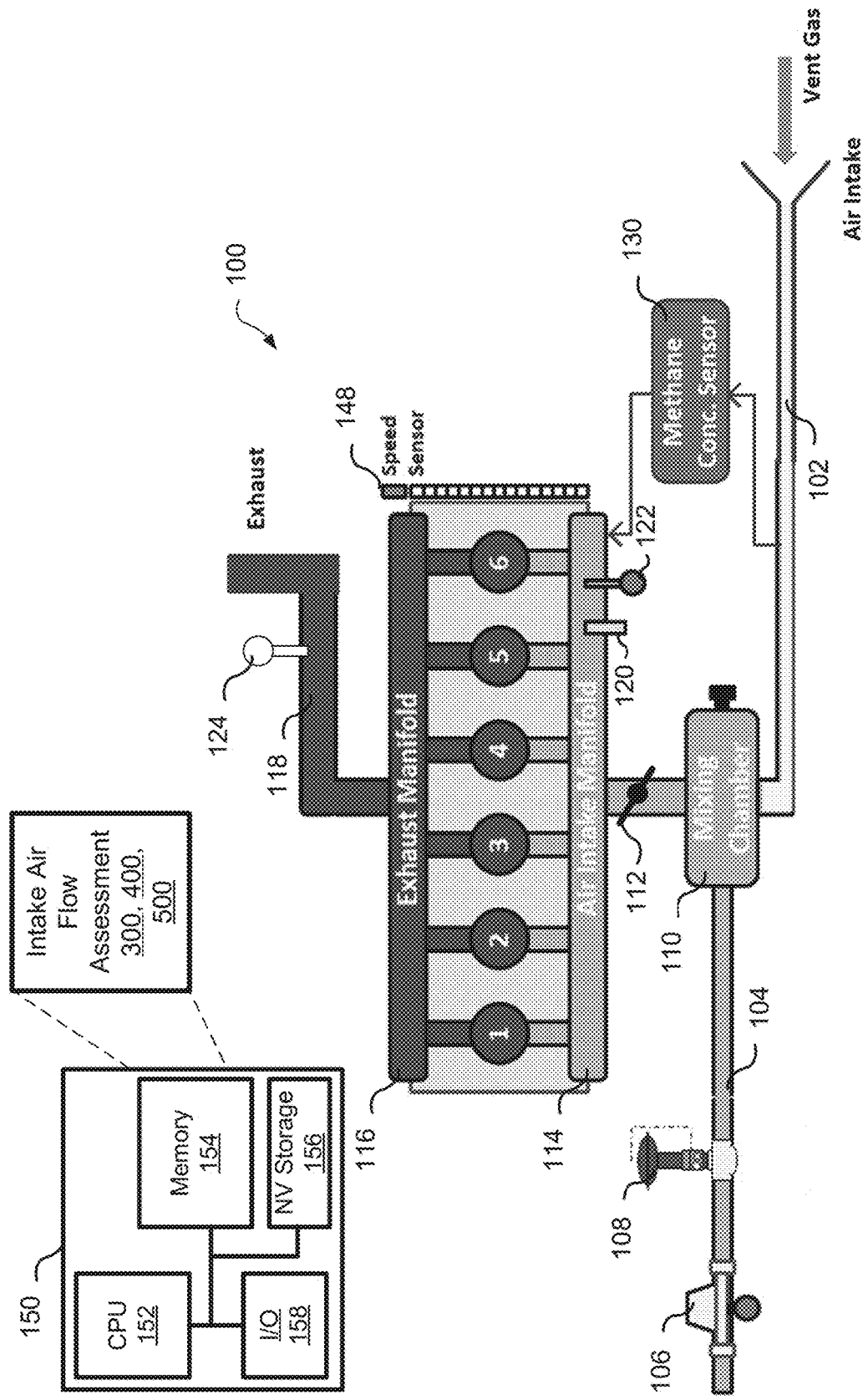
FIG. 1 shows a representation of a naturally aspirated engine with added vent gas.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of assessing intake air flow to an industrial engine operating on a main fuel, the intake air including vent gases including methane produced by one or more vent sources, the method executed by a processor including: receiving methane concentration data of a concentration of methane in the intake air as measured by a methane concentration sensor disposed at a location along an intake line prior to the intake air being mixed with main fuel; determining a flow rate of the intake air into the engine; and calculating an amount of methane in the intake air into the engine, a flow rate of methane calculated corresponding to methane introduced to the intake air by the vent gas. Other embodiments of this aspect include corresponding computer systems, apparatus, and computer programs recorded on one or more computer storage devices, each configured to perform the actions of the methods.

Implementations may include one or more of the following features. The method where the flow rate of the intake air is determined by receiving flow rate data of the intake air flow rate as measured directly along the intake air line. The method where the intake air flow rate is measured by an measurement device positioned within the intake airflow path. The method where the flow rate of the intake air is determined by: receiving pressure data of an air-fuel mixture in an intake manifold of the engine measured by a pressure sensor associated with the engine, the air-fuel mixture in the intake manifold being a mixture of the intake air and the main fuel; receiving temperature data of the air-fuel mixture in the intake manifold measured by a temperature sensor associated with the engine; and calculating a flow rate of an air component of the air-fuel mixture using the pressure data and the temperature data of the air-fuel mixture, the flow rate of the air component corresponding to the flow rate of the intake air including the methane. The method where the flow rate of the intake air is determined by: receiving flow rate data of the main fuel mixed with the intake air measured by a fuel flow rate sensor prior to the intake air and the main fuel having been mixed; determining a flow rate of the intake air required for combustion of the main fuel; determining an excess air fraction representative of an amount of air provided to the engine in excess of the flow rate of intake air required for combustion; and calculating a total flow rate of the intake air to the engine using the flow rate of the intake air required for combustion and the excess air fraction, the total flow rate of the intake air corresponding to the flow rate of the intake air. The method where the flow rate of the intake air required for combustion of the combined fuel is determined by: determining a flow rate of the intake air required to combust each constituent of the combined fuel; and summing the determined flow rates of the intake air required to combust the constituents of the combined fuel. The method where the flow rate of the intake air required for combustion of the combined fuel is determined based on: receiving flow rate data of exhaust gas produced by the combustion of the intake air measured by an exhaust gas sensor at an exhaust of the engine. The method where the excess air fraction is determined by: receiving exhaust oxygen fraction data of exhaust gas produced by the combustion of the intake air measured by an oxygen gas sensor at an exhaust of the engine. The method where the excess air fraction is determined by: receiving pressure data of an air-fuel mixture in an intake manifold of the engine measured by a pressure sensor associated with the engine, the air-fuel mixture in the intake manifold being a mixture of the intake air and the main fuel; receiving temperature data of the air-fuel mixture in the intake manifold measured by a temperature sensor associated with the engine; and calculating the excess air fraction using the flow rate data of the fuel, a composition of the fuel, the pressure data, and the temperature data. The method further including: monitoring the amount of methane in the intake air over a period of time; and calculating avoided greenhouse gas emissions over the period of time. The method further including: sending a command to control a flow rate of the fuel for mixing with the intake air based on the amount of methane in the intake air. The method where the industrial engine is a natural gas engine. The method where the industrial engine is a spark ignited engine or a compression ignited engine. Implementations of the described techniques may include hardware, a method or process, or computer software on a computer-accessible medium.

One general aspect includes a system for assessing intake air flow to an industrial engine operating on a main fuel, the intake air including vent gases including methane produced by one or more vent sources, the system including: a gas concentration sensor for measuring a concentration of methane in the intake air prior to mixing of the intake air and the main fuel; and a controller configured to receive gas concentration data from the gas concentration sensor, receive sensor data from one or more additional sensors associated with the engine, and calculate an amount of the methane in the intake air flowing into the engine. Other embodiments of this aspect include corresponding computer systems, apparatus, and computer programs recorded on one or more computer storage devices, each configured to perform the actions of the methods.

Implementations may include one or more of the following features. The system further including: a pressure sensor for measuring a pressure of an air-fuel mixture in an intake manifold of the engine, the air-fuel mixture being a mixture of the intake air and the main fuel; and a temperature sensor for measuring a temperature of the air-fuel mixture in the intake manifold of the engine, where the controller is further configured to. The system may also include receive methane concentration data of a concentration of methane in the intake air as measured by a methane concentration sensor disposed at a location along an intake line prior to the intake air being mixed with main fuel. The system may also include determine a flow rate of the intake air. The system may also include calculate an amount of methane in the intake air, the amount of methane calculated corresponding to methane introduced to the intake air by the vent gas. The system where the controller is configured to determine the flow rate of the intake air used for combustion of combined fuel by: determining a flow rate of the intake air required to combust each constituent of the combined fuel; and summing the determined flow rates of the intake air required to combust the constituents of the combined fuel. The system further including: an exhaust gas sensor for measuring a flow rate of exhaust gas produced by combustion of the intake air, where the controller is configured to receive flow rate data of the exhaust gas from the exhaust gas sensor for determination of the flow rate of intake air used for combustion of the main fuel. The system further including: an oxygen sensor for measuring an oxygen fraction of exhaust gas, where the controller is configured to receive exhaust oxygen fraction data of the exhaust gas from the oxygen sensor for determination of an excess air fraction. The system further including: a pressure sensor for measuring a pressure of an air-fuel mixture in an intake manifold of the engine, the air-fuel mixture being a mixture of the intake air and the fuel; and a temperature sensor for measuring a temperature of the air-fuel mixture in the intake manifold of the engine, where the controller is configured to. The system may also include receive pressure data from the pressure sensor. The system may also include receive temperature data from the temperature sensor. The system may also include calculating an excess air fraction using flow rate data of a combined fuel, a composition of the fuel, the pressure data, and the temperature data. The system where the gas concentration sensor is configured to measure a concentration of methane in the intake air, and an amount of gas in the intake air is an amount of methane in the intake air. Implementations of the described techniques may include hardware, a method or process, or computer software on a computer-accessible medium.

When combustible gases from various vent sources are introduced to the air intake of an industrial engine, the flow of these vent gases is, by nature, uncontrolled. Accordingly, a measurement of the flow of vent gas is required. Normally this measurement is performed by an in-line flow meter for the vent gas calibrated for the specific gas to be measured.

In the existing SlipStream® designs, for example, a low restriction flow meter is used to determine the vent gas flow into the engine. This measurement has several purposes, including: it enables the flow to the engine to be limited to a predetermined maximum to ensure good engine control; where the engine air-to-fuel ratio is based on a measurement of the engine fuel, the vent gas measurement is added to the normal fuel flow measurement; and the flow rate of vent gas times the methane mass percentage of the vent gas is used to calculate avoided greenhouse gas (GHG) emissions.

To be eligible for GHG credits this latter requirement requires that the flow meter be calibrated according to the manufacturer's recommendation. As well a vent gas sample must be analyzed for methane content regularly to be eligible for GHG credits. Because of these needs for regular calibration and vent gas analysis, there is incentive for an alternative to the existing methane quantification method.

Improvements can be achieved by an alternative quantification process using a methane concentration sensor and a determination of the engine intake air flow. A concentration measurement may be performed after the vent gas has been introduced and mixed with the engine intake air. Then, a measurement of the concentration of the methane in the intake air and a determination of the intake air flow rate enables a calculation of the amount of methane that has been introduced into the intake air over a period of time. Since methane is the principal component of natural gas and methane is a greenhouse gas, it is useful to measure the amount of methane. However, additional or alternative gas concentration sensors could be used to measure the concentration of other gas components, if desired.

With a suitable methane concentration sensor, on-line measurement of the amount of methane that is provided to the engine by the introduction of vent gas can be achieved without requiring regular gas sampling for methane content or flow meter calibration. The methane concentration sensor or other gas concentration sensor and the methods described herein could be used with SlipStream® technology, for example.

By measuring the methane concentration of the intake air downstream of the addition of the vent gases the amount of vent gas added can be determined by using direct intake airflow measurements, tracer gas dilution (see, e.g. ASTM method E2029-11 "Volumetric and Mass Flow Rate Measurement in a Duct Using Tracer Gas Dilution", the contents of which are incorporated herein by reference), or calculation from measurements of either the engine fuel flow and exhaust oxygen fraction or intake manifold pressure and temperature. The advantages of measurement of methane concentration in the intake air compared to direct measurement of vent gas flow by a flow meter include:

Vent gases containing methane that are undiluted and vent gases diluted with non-combustible components may be added to the intake air and used for greenhouse gas credits;

No composition analysis of the vent gases is required for determination of the $CO_2e$ value of the system, e.g. the SlipStream® technology; and Availability of self-calibrating methane measurement instruments.

$CO_2e$ is a measure of the methane, nitrous oxide etc. and multiplication factors for each component as recommended by the Intergovernmental Panel on Climate Change (IPCC).

Determination of the methane flow rate requires a determination of the intake air flow rate. While this may be done by a direct measurement of the intake air flow using an orifice measurement device or a hot wire anemometer, for example, the intake air flow may be calculated using instrumentation already in place for engine air-to-fuel ratio control. The present disclosure further describes two methods for calculating the intake air flow. A first method uses intake manifold pressure, temperature and engine speed, while a second method uses a fuel flow rate and an exhaust oxygen percentage.

Embodiments are described below, by way of example only, with reference to FIGS. 1-5.

FIG. 1 shows a representation of a naturally aspirated engine 100 with added vent gas. The engine 100 is an industrial engine. Vent gas from one or more vent sources is added to the intake air received in air intake line 102. The vent gas comprises one or more combustible gases produced by upstream processes, which includes methane gas in this embodiment. The vent source can be air-free such as from a compressor packing leak or mixed with other gases such as those from crankcase vapors or a combination of these sources. The engine 100 may be a natural gas engine and therefore the methane added to the vent gas can be used as a fuel source for the engine to combust, thereby reducing atmospheric effects that may have otherwise existed if the vent gas were simply released to the atmosphere, and also reducing the amount of fuel used in the engine 100. Although the disclosure may refer to natural gas engines in particular, the teachings herein may be applied to any other spark ignited or compression ignited/diesel engines.

The intake air with the vent gas added therein travels along the air intake line 102 to the engine cylinders. The main fuel reaches the engine cylinders either through a mixing chamber or carburetor 110, where the intake air (including the vent gas) are mixed with main/principal fuel or directly injected to the engine cylinders The main/principal fuel is supplied to the engine whether or not vent gas is available. The fuel is provided along fuel intake line 104 which may have disposed there-along one or more sensors (e.g. fuel flow rate sensor 106) and one or more valves (e.g. fuel control valve 108). The air-fuel mixture of the intake air and the main fuel produced in the mixing chamber 110 passes into air intake manifold 114, regulated for example via a throttle 112. The air-fuel mixture in the air intake manifold 114 is combusted in the engine 100. Exhaust gas is produced from the combustion and passes into an exhaust manifold 116 and through exhaust piping 118.

A temperature sensor 120 and pressure sensor 122 may be provided at the air intake manifold 114 for respectively measuring the temperature and the pressure of the air-fuel mixture. One or more exhaust sensors 124 may also be provided along the exhaust piping 118. For example, the one or more exhaust sensors 124 may include an exhaust gas sensor for measuring a flow rate of the exhaust gas, an oxygen sensor for measuring an oxygen fraction of the exhaust gas, etc. The fuel flow rate sensor 106, temperature sensor 120, pressure sensor 122, one or more exhaust sensors 124, etc., may be existing sensors for the engine 100 and used for air-to-fuel ratio control.

A methane concentration sensor 130 is disposed at a location along the air intake line 102 prior to the intake air and main fuel being mixed in the mixing chamber 110 and downstream from where the vent gas is introduced to the engine intake air. After the vent gases are introduced to the intake air a small fraction of air flow is directed to the methane concentration sensor 130 and then vented to the air intake manifold 114 which is at a lower pressure than the air in the air intake line 102. For a V-configuration engine with separate carburetors and/or separate air intakes either samples of the intake air can be collected from each bank or two methane concentration sensors can be used. In this case, care must be taken to ensure that the sample flowing to the methane concentration sensor is representative of the amount of vent gas added. Mixing vanes may be required for this purpose.

The operating pressure and speed of response of the methane concentration sensor 130 can be controlled by the sizing of the sensor tubing and in-line orifices. If the methane concentration sensor 130 is significantly affected by the variable pressure of the intake manifold 114, a solenoid valve (not shown) between the methane concentration sensor 130 and the intake manifold can be closed during the measurement period and periodically opened for a new gas sample. It would be appreciated by those skilled in the art that FIG. 1 shows just one of many air-fuel ratio control methods, and that deviations from the configuration shown in FIG. 1 may be made without departing from the scope of this disclosure.

The output of the methane concentration sensor 130 is sent to controller 150, which may for example be part of an electronic air-fuel control system. The controller 150 is configured to receive data from the methane concentration sensor 130 as well as some or all of the other sensors (e.g. fuel flow rate sensor 106, temperature sensor 120, pressure sensor 122, one or more exhaust sensors 124, etc.). The data may be received wirelessly or through a wired connection through an input/output interface of the controller 150. The controller 150 may also be configured to output commands through its I/O interface, e.g. commands to the fuel control valve 108. The controller 150 may also be configured to interface with equipment/components from a plurality of engines (not shown).

The controller 150 may comprise a microcontroller/central processing unit (CPU) 152, a memory 154, a non-volatile (NV) storage 156, and input/output interfaces 158 coupled to sensors, such as methane sensor 130 or speed sensor 148 and/or other engine management system. The memory 154 is a non-transitory computer-readable memory that may store instructions for execution by the CPU 152. The instructions stored on the memory 152 may include instructions for performing intake airflow assessment, which when the instructions are executed by the CPU 152 may configure the controller to perform methods 300 or 400 as described with reference to FIGS. 3 to 5 herein.

Figure 2:
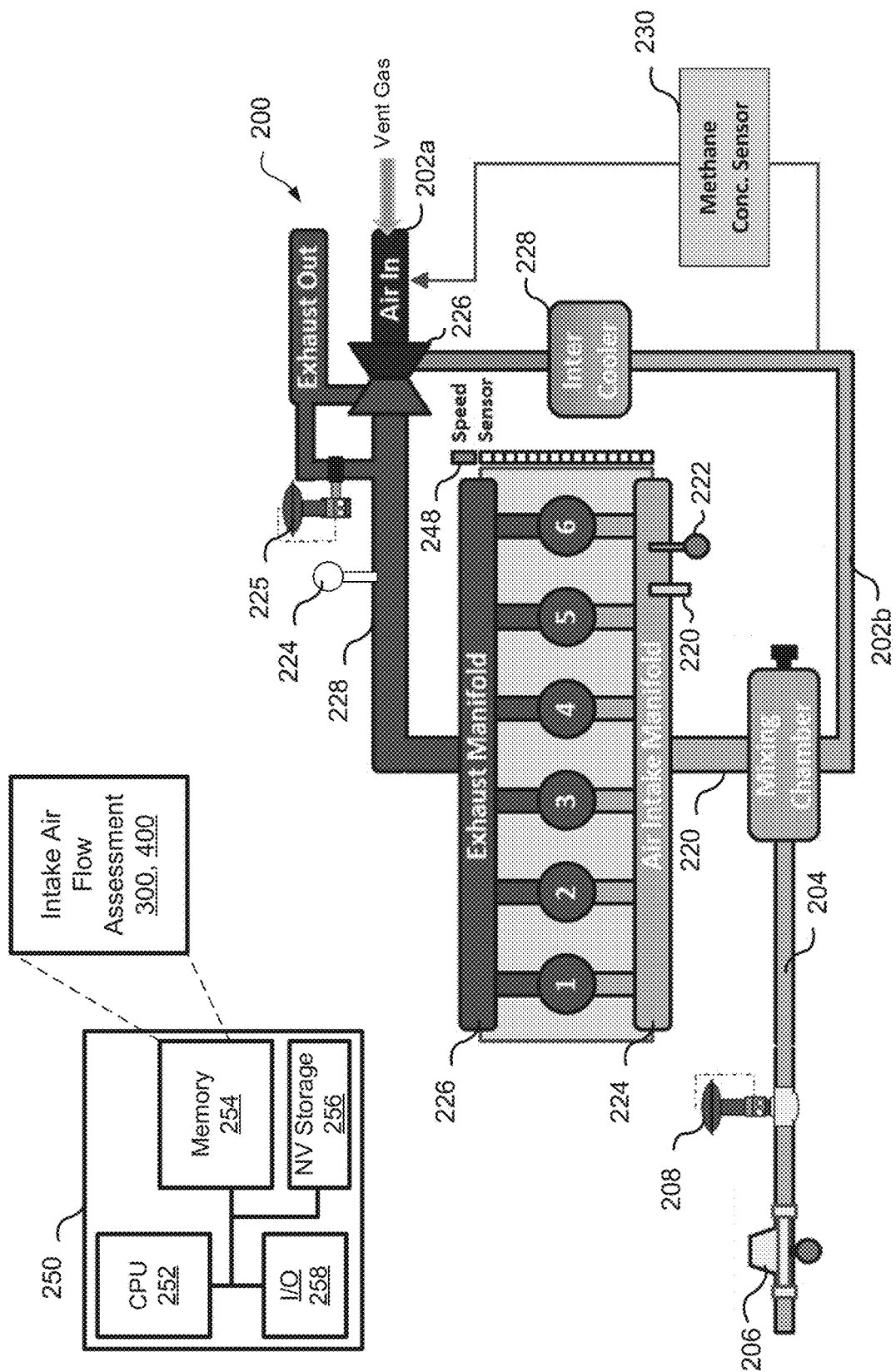
FIG. 2 shows a representation of a turbocharged engine with added vent gas.

FIG. 2 shows a representation of a turbocharged engine 200 with added vent gas. The turbocharged engine 200 is representative of a typical turbocharged internal combustion engine where combustible vent gases are introduced to the intake air. The turbocharged engine 200 is similar to engine 100, except that in the engine 200 the intake air is pressurized with a turbocharger 226. The turbocharged engine 200 comprises an air intake line 202a which receives intake air with vent gas added therein, and air intake line 202b which receives the intake air after having been pressurized by the turbocharger 226. The air intake line 202b may further comprise an intercooler 228 for reducing the temperature of the air after having been turbocharged by the turbocharger.

Otherwise, the turbocharged engine 200 may have a similar configuration as the engine 100. The intake air with the vent gas included therein travels along the air intake line 202b to a mixing chamber 210, where the turbocharged air (including the vent gas) are mixed with the main fuel. The main fuel is provided along fuel intake line 204 which may have disposed there-along one or more sensors (e.g. fuel flow rate sensor 206) and one or more valves (e.g. fuel control valve 208). The air-fuel mixture generated in the mixing chamber 210 passes into air intake manifold 214. The air-fuel mixture in the air intake manifold 214 is combusted in the engine 200. Exhaust gas is produced from the combustion that passes into an exhaust manifold 216 and through exhaust piping 218. A temperature sensor 220 and pressure sensor 222 may be provided at the air intake manifold 214 for respectively measuring the temperature and the pressure of the air-fuel mixture in the intake manifold. One or more exhaust sensors 224 and control components (e.g. an air exhaust waste-gate control valve 225) may also be provided along the exhaust piping 218. It would be appreciated by those skilled in the art that FIG. 2 shows just one of many air-fuel ratio control methods, and that deviations from the configuration shown in FIG. 2 may be made without departing from the scope of this disclosure.

For the turbocharged engine 200 the methane concentration sensor 230 is disposed along the air intake line 202b to sample the air therefrom. The methane sensor sample could be discharged into the air intake manifold 214 as shown in FIG. 1 or discharged to the atmosphere. In FIG. 2 a gas sample from the turbocharger output is taken and made to flow past the methane concentration sensor 230 and then routed back to the air intake line 202a to prevent any escape of the methane to the atmosphere. For V-engines with separate turbochargers gas can be extracted from each bank or a second methane sensor could be used. Orifices or solenoid valves can be used to ensure the pressures experienced by the methane sensors are nearly unaffected by the turbocharger output pressures.

The configuration shown in FIG. 2, with the suitable choice of tubing and flow orifice sizing, reduces pressure variations due to engine load and/or speed changes of the gas sample in the methane concentration sensor. Since the turbocharger provides vigorous mixing, the sample flowing to the methane concentration sensor can be considered representative.

If the methane concentration sensor 230 is significantly affected by the variable pressure of the air at the output of the intercooler, a solenoid valve between the sensor and the pressurized air supply can be closed during the measurement period and periodically opened for a new gas sample.

Similar to the implementation of FIG. 1, the output of the methane concentration sensor 230 can be sent to the controller 250. The controller 250 is configured to receive data from the methane concentration sensor 230 as well as any of the other sensors (e.g. fuel flow rate sensor 206, temperature sensor 220, pressure sensor 222, speed sensor 248, one or more exhaust sensors 224). The controller 250 may also be configured to output commands through its I/O interface, e.g. commands to the fuel control valve 208.

For the above-described engines shown in FIGS. 1 and 2, a methane concentration sensor 130/230 is used to provide a direct measurement of the methane concentration in the intake air that is being combusted by the engine. Direct measurement of the methane concentration of the air-fuel mixture before combustion in the engine to achieve air-fuel control is also possible. However, the lack of measurement of other combustible components typically found in natural gas sources may inhibit the efficiency of such a control method.

Figure 3:
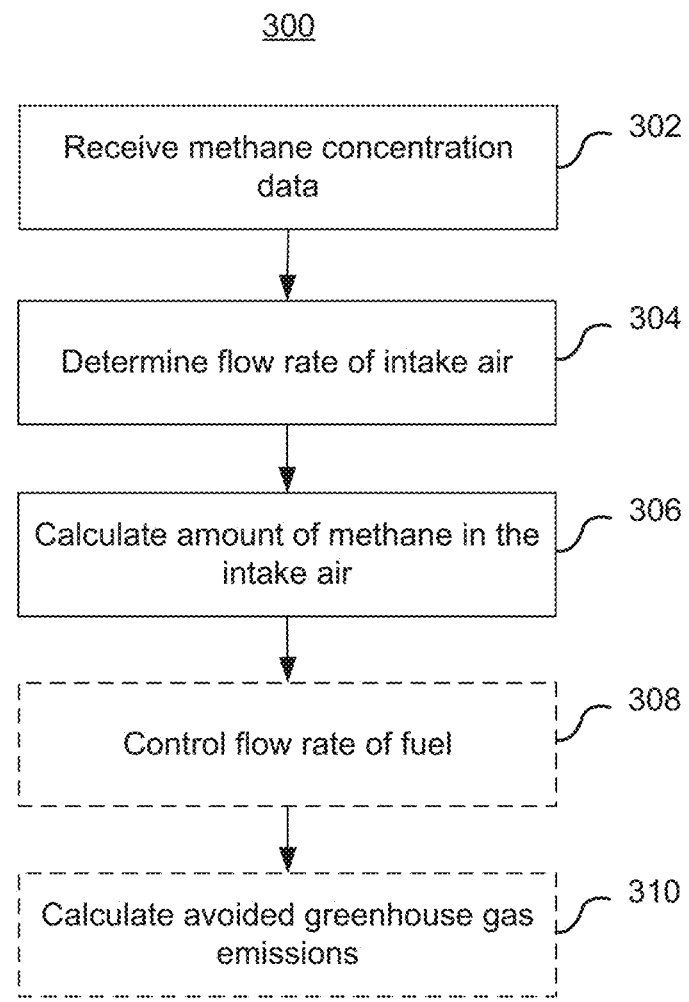
FIG. 3 shows a method of assessing intake air flow to an industrial engine.

The amount of methane flowing to the engine that is introduced by the vent gas can be calculated from the methane concentration measurement and an intake air flow rate. FIG. 3 shows a method 300 of assessing intake air flow to an industrial engine. The method 300 may be performed by the controller 150/250 upon execution of the computer-readable instructions stored on the non-transitory memory.

Methane concentration data is received (302) at the processor of the controller 150/250. The methane concentration data may be received from the methane concentration sensor 130/230 that samples the intake air with the added vent gas prior to the air intake manifold. A flow rate of the intake air is determined (304). The determination of the flow rate of the intake air is described in more detail below. The flow rate of the methane from the vent gases is the product of the methane concentration and the intake air flow rate. (306). The amount of methane in the intake air corresponds to the amount of methane introduced by the vent gas provided to the engine.

In an engine with a speed governor the main fuel flow is automatically reduced as the combustible vent gas flow increases. In an engine with air-to-fuel ratio control the combustible methane vent gas flow rate may or may not be required as an input to achieve the desired control according to the air-to-fuel ratio control method that is used (308).

The flow rate of methane in the intake air may be monitored over a period of time. Accordingly, avoided greenhouse gas emissions over a measurement period may be calculated (310). The use of the methane concentration sensor and calculation of the amount of methane in the intake air may allow for an accurate determination of greenhouse gas credits that an entity is eligible for as a result combusting the vent gas.

Measurement of the intake air flow rate can be performed directly with specific devices such as an orifice meter or hot wire anemometer to provide compensation is made for the vent gas component in the air according to the various types of gas components. Having measured the intake air flow rate directly using the measurement devices the amount of methane in the intake air can be calculated.

Alternatively, the outputs from the sensors used for engine air-fuel control may be used to determine the air flow rate. Two methods for determining the intake air flow rate are described, which may be implemented using instrumentation already in place for engines with air-to-fuel ratio control. A first method uses the engine speed and the temperature and pressure of the air-fuel mixture in the air intake manifold 114/214, as measured using the temperature sensors 120/220 and the pressure sensors 122/222, for example. A second method uses a fuel flow rate and exhaust oxygen percentage, as measured using the fuel flow rate sensor 106/206 and the one or more exhaust sensors 124/224, for example.

Figure 4:
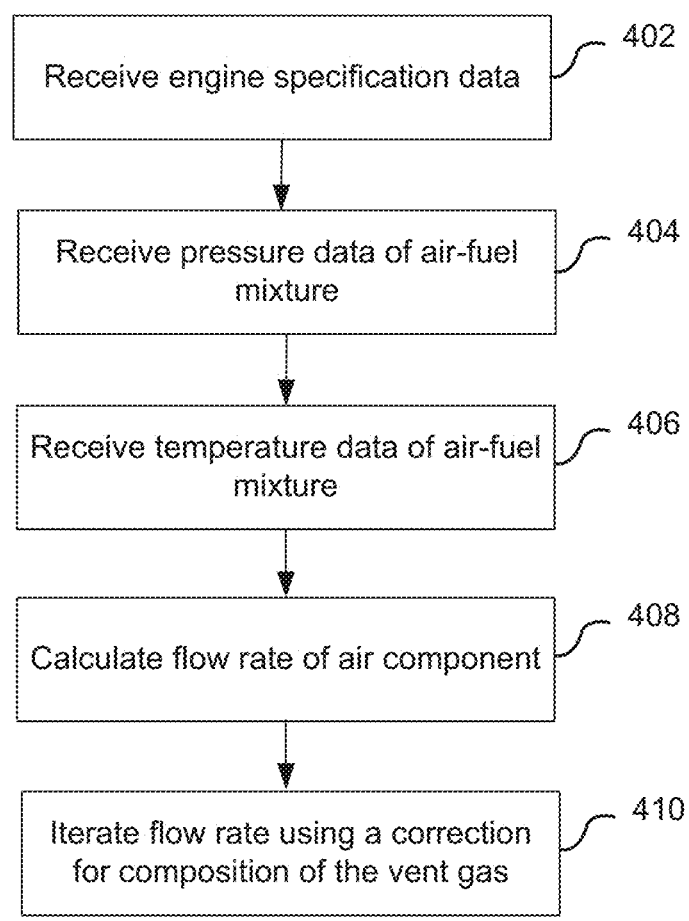
FIG. 4 shows a method of calculating the intake air flow rate in accordance with some embodiments.

FIG. 4 shows a method 400 of calculating the intake air flow rate in accordance with some embodiments. The method 400 may be performed by the controller 150/250 upon execution of the computer-readable instructions stored on the non-transitory memory.

In the method 400, engine specifications such as bore and stroke and main fuel composition are provided (402) and pressure data of the air-fuel mixture is received (402). For example, the controller 150/250 may receive the pressure data from the pressure sensor 122/222 and speed/rpm input from the engine. Temperature data of the air-fuel mixture is received (406). The controller 150/250 may receive the temperature data from the temperature sensor 120/220. Using the engine speed data, the pressure data and the temperature data of the air-fuel mixture and the main fuel composition fractions, and engine specifications a flow rate of the air component of the air-fuel mixture is calculated (408). The air component of the air-fuel mixture corresponds to the intake air fraction of the air-fuel mixture. Accuracy may be improved by performing one or more iterations of the calculation of the air flow using a correction for composition of the vent gas (410). The calculation of the flow rate of the air component is described in more detail below.

The calculation of the flow rate of the air component based on the air-fuel mixture temperature and pressure in the intake manifold (e.g. 406 in method 400) is now described.

An internal combustion engine can be considered as a gaseous pump where the amount per minute of intake gas that flows into the engine cylinder on an intake stroke is the product of the piston stroke times piston area times the absolute gas pressure divided by the absolute temperature times the number of intake strokes per minute times the number of engine cylinders on the intake manifold times the volumetric efficiency of the engine cylinder. The volumetric efficiency is the fraction of gas from the intake manifold that flows to the engine cylinder volume when the intake valve(s) is(are) open.

For a natural gas engine, the air flow component of the total intake air flow can be calculated from the composition of the fuel (e.g. methane, ethane, propane fractions) and the ratio of the fuel flow to the intake air flow using standard relationships.

For example, using the perfect gas law for a 4-stroke cycle engine, the molar flow rate of air can be calculated with the following Equation (1):

$$F_m = nNVP_a V_e / 2RT \qquad (1)$$

where $F_m$ is the molar flow rate of air;
n is the number of engine cylinders;
N is the engine speed;
$P_a$ is the absolute partial pressure of the air in the intake manifold;
V is the cylinder swept volume;
$V_e$ is the volumetric efficiency of the engine cylinder (this can be determined for a specific cylinder head design from fuel flow and exhaust oxygen measurements);
R is the universal gas constant; and T is the absolute temperature of the air/air vent gas mixture.

The partial pressure of the air component of the air-fuel mixture, $\Psi$, is given approximately by Equation (2):

$$P_a = P_s * P_A \quad (2)$$

where $P_A = C1*9.56\lambda/(1+9.56\lambda) + C2*16.73\lambda/(1+16.73\lambda) + \ldots$, and where $P_s$ is the absolute intake manifold pressure;
$\lambda$ is the excess air fraction;
C1 is the molar fraction of methane in the main fuel;
C2 is the molar fraction of ethane in the main fuel; and
terms for other hydrocarbons, e.g. C3 to C6 can be added as required.

If the main fuel composition is relatively steady and if the air fuel ratio is controlled when the vent gases are present, then little error is introduced by replacing $P_A$ by a constant calculated from the fuel gas analysis and the excess air fraction set-point.

Accordingly, using a concentration of methane in the intake air and the above-calculated flow rate of the air-component of the air-fuel mixture to the engine, an approximate amount of the methane in the intake air flowing to the engine can be calculated (306 in method 300). The accuracy of the calculation can be improved by adjusting the values of C1 to C6 according to relative flow rates of vent gas and main fuel and performing the calculation for one or more iterations.

Figure 5:
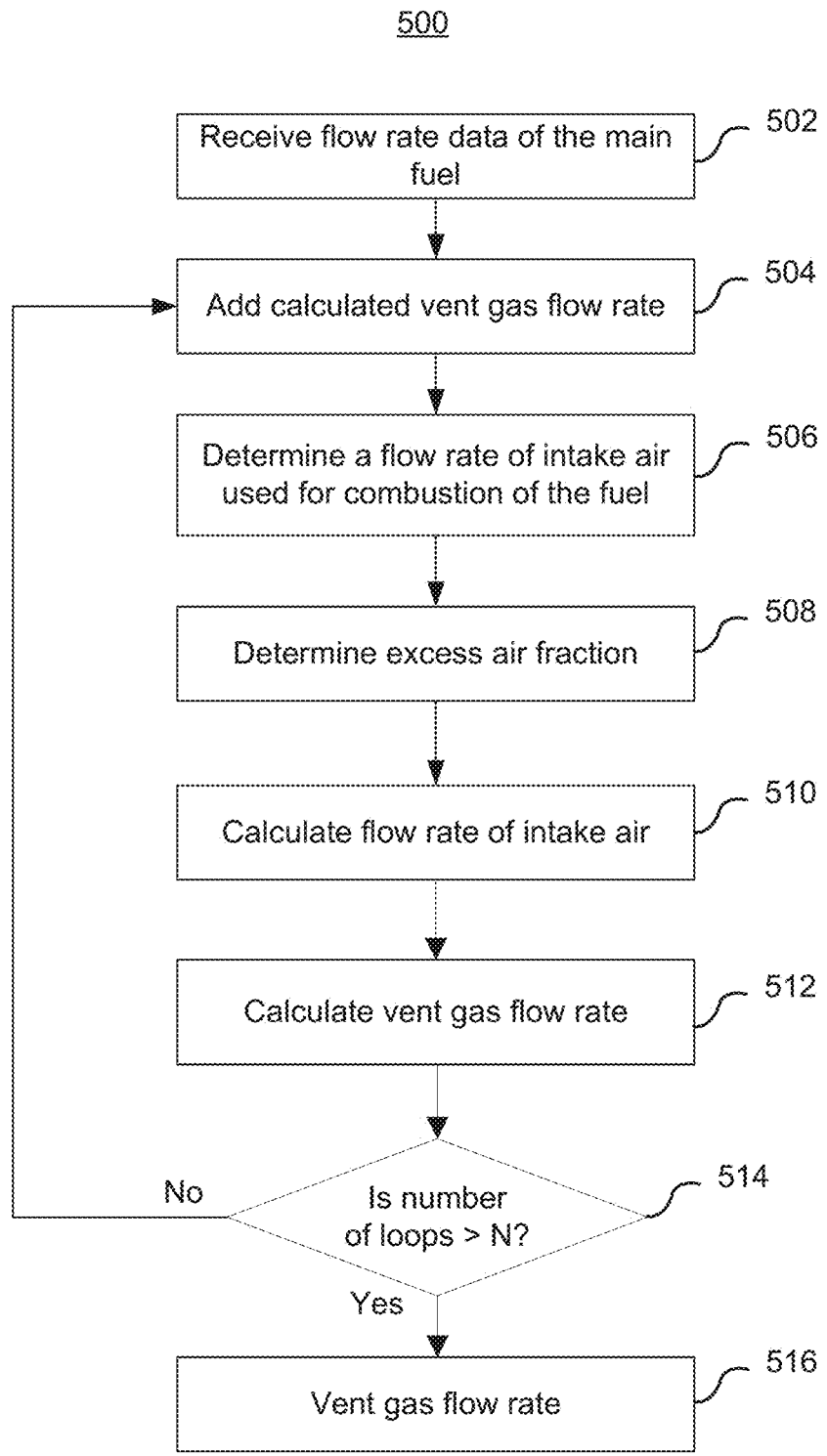
FIG. 5 shows a method of calculating the intake air flow rate in accordance with some embodiments.

FIG. 5 shows a method 500 of calculating the intake air flow rate in accordance with some embodiments. The method 500 may be performed by the controller 150/250 upon execution of the computer-readable instructions stored on the non-transitory memory. The method 500 determines the intake air flow rate using the measured main fuel flow to the engine and the measured exhaust oxygen concentration.

In the method 500, flow rate data of the main fuel is received (502). For example, the controller 150/250 may receive the main fuel flow rate data from the fuel flow rate sensor 106/206. A calculated vent gas flow rate is added (504), on initial operation a default, estimate or historical value can be used. A flow rate of intake air used for combustion of the combined fuel is determined (506). An excess air fraction representative of an amount of air provided to the engine in excess of the flow rate of intake air used for combustion is determined (508). A total flow rate of the intake air to the engine is calculated (510). The determinations/calculations at (506), (508), and (510) are described in more detail below. The vent gas flow rate (512) is then calculated. As the calculation is iterative, if calculated vent gas flow rate has not converged or there are additional defined processing loops of the method (NO at 514) the calculated vent gas flow rate is added (504) and the process continues. If the vent gas flow rate converges or the number of iterations is met (YES at 514) the vent gas flow rate is determined (516).

From the chemical combustion equations, the mass of intake air required to fully combust the fuel depends on the fuel components. For example, with stoichiometric combustion, a flow of 1 kg/h of methane fuel requires (2*32*2+ 2*28*3.77)/16=17.2 kg/h of air. The values 32, 28, and 16 are respectively the approximate molecular weights of oxygen, nitrogen and methane molecules. The factor 3.77 is the ratio of inert gases, nitrogen and argon, to oxygen in air. If the combustion occurs with an excess air fraction lambda, $\lambda$, greater than 1, the amount of air needed is 17.2*$\lambda$ kg/h. The appropriate values for ethane (16.0), propane (15.6), butane (15.4), pentane (15.3) and hexane (15.2) and other fuel components can be calculated from the respective combustion equations.

An equivalent calculation of intake air flow may also be determined from the exhaust gas flow using the methodology embodied in the EPA Method 19 (accessible at https://www.epa.gov/sites/production/files/2017-08/documents/method_19.pdf), the entire content of which is incorporated by reference herein.

The excess air fraction $\lambda$ can be calculated approximately from the exhaust oxygen fraction measured by a wide range exhaust gas oxygen sensor, UEGO. A more precise calculation uses the fuel composition, as described for example in "Extension of the Equation for the Calculation of the Air-Fuel Equivalence Ratio", SAE Technical paper 972989 (1997), by Brettschneider, J., the contents of which is incorporated by reference herein.

Alternatively, the excess air fraction may be calculated from the fuel flow rate, the fuel composition, the intake manifold pressure and intake manifold temperature.

An approximate correction for the vent gas contribution to the fuel flow can be derived from the composition of the main fuel, while a more precise correction also requires knowledge of the vent gas composition.

So, if the mass fractions of the engine fuel components are determined and the excess air fraction is determined, the mass flow rate for the intake air can easily be calculated.

For GHG determinations an accuracy of methane concentration over the range of interest of +/− 5% of the measured value should be sufficient. Both of the above-described methods provide a way of determining the flow rate of intake air into the engine. Multiplied by the concentration of methane in the intake air give the flow rate of the methane component of the vent gas added to the intake air. For most circumstances where the vent gas faction of the engine fuel is relatively small (say less than 15%) or the majority (say 75%) of the vent gas is methane, the methane flow calculation methods are sufficiently accurate. If the combustible fuel portion from the vent gas compared to the main fuel gas is substantial, or if the fraction of methane in the vent gas is less than 50 to 75%, it may be necessary to analyse and use the composition of the vent gas in the calculations.

Refinements may be added to each of the methods for calculation of the air flow rate to improve the accuracy of the calculations without departing from the scope of this disclosure.

The frequency of calibration for the various sensors will be subject to details of the sensor technology.

It would be appreciated by one of ordinary skill in the art that the system and components shown in FIGS. 1-5 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as described herein.

What is claimed is:
1. A method of assessing intake air flow to an industrial engine operating on a main fuel, the intake air including vent gases comprising a supplemental fuel including methane produced by one or more vent sources, the method executed by a processor comprising:
receiving methane concentration data of a concentration of methane in the intake air as measured by a methane concentration sensor disposed at a location along an intake line prior to the intake air being mixed with the main fuel;

determining a flow rate of the intake air flowing into the engine; and calculating a flow rate of methane in the intake air flowing into the engine based on the concentration of methane in the intake air and the flow rate of the intake air, wherein the flow rate of methane corresponds to methane introduced to the intake air by the vent gas.

2. The method of claim 1, wherein the flow rate of the intake air is determined by receiving flow rate data of the intake air flow rate as measured directly along the intake air line.

3. The method of claim 2, wherein the intake air flow rate is measured by a measurement device positioned within the intake airflow path.

4. The method of claim 1, wherein the flow rate of the intake air is determined by:

receiving pressure data of an air-fuel mixture in an intake manifold of the engine measured by a pressure sensor associated with the engine, the air-fuel mixture in the intake manifold being a mixture of the intake air and the main fuel;

receiving temperature data of the air-fuel mixture in the intake manifold measured by a temperature sensor associated with the engine; and calculating a flow rate of an air component of the air-fuel mixture using the pressure data and the temperature data of the air-fuel mixture, the flow rate of the air component corresponding to the flow rate of the intake air including the methane.

5. The method of claim 1, wherein the flow rate of the intake air is determined by:

receiving flow rate data of the main fuel measured by a fuel flow rate sensor prior to the intake air and the main fuel having been mixed;

determining a flow rate of the intake air required for combustion of combined fuel comprising the main fuel and the supplemental fuel;

determining an excess air fraction representative of an amount of air provided to the engine in excess of the flow rate of intake air required for combustion; and calculating the flow rate of the intake air flowing to the engine using the flow rate of the intake air required for combustion and the excess air fraction.

6. The method of claim 5, wherein the flow rate of the intake air required for combustion of the combined fuel is determined by:

determining a flow rate of the intake air required to combust each constituent of the combined fuel; and summing the determined flow rates of the intake air required to combust the constituents of the combined fuel.

7. The method of claim 5, wherein the flow rate of the intake air required for combustion of the combined fuel is determined based on:

receiving flow rate data of exhaust gas produced by the combustion of the intake air measured by an exhaust gas sensor at an exhaust of the engine.

8. The method of claim 5, wherein the excess air fraction is determined by:

receiving exhaust oxygen fraction data of exhaust gas produced by the combustion of the intake air measured by an oxygen gas sensor at an exhaust of the engine.

9. The method of claim 5, wherein the excess air fraction is determined by:

receiving pressure data of an air-fuel mixture in an intake manifold of the engine measured by a pressure sensor associated with the engine, the air-fuel mixture in the intake manifold being a mixture of the intake air and the main fuel;

receiving temperature data of the air-fuel mixture in the intake manifold measured by a temperature sensor associated with the engine; and calculating the excess air fraction using the flow rate data of the main fuel, a composition of the combined fuel, the pressure data, and the temperature data.

10. The method of claim 1, further comprising:

calculating an amount of methane in the intake air over a period of time based on the flow rate of methane; and calculating avoided greenhouse gas emissions over the period of time.

11. The method of claim 1, further comprising:

sending a command to control a flow rate of the main fuel for mixing with the intake air based on the flow rate of methane in the intake air.

12. The method of claim 1, wherein the industrial engine is a natural gas engine.

13. The method of claim 1, wherein the industrial engine is a spark ignited engine or a compression ignited engine.

14. A system for assessing intake air flow to an industrial engine operating on a main fuel, the intake air including vent gases comprising a supplemental fuel including methane produced by one or more vent sources, the system comprising:

a methane concentration sensor disposed at a location along an intake line for measuring a concentration of methane in the intake air prior to mixing of the intake air and the main fuel; and a controller configured to:

receive methane concentration data of the concentration of methane in the intake air from the methane concentration sensor, receive sensor data from one or more sensors associated with the engine, determine a flow rate of the intake air flowing into the engine based on the sensor data, and calculate a flow rate of the methane in the intake air flowing into the engine based on the concentration of methane in the intake air and the flow rate of the intake air, wherein the flow rate of methane corresponds to methane introduced to the intake air by the vent gas.

15. The system of claim 14, further comprising:

a pressure sensor for measuring a pressure of an air-fuel mixture in an intake manifold of the engine, the air-fuel mixture being a mixture of the intake air and the main fuel; and a temperature sensor for measuring a temperature of the air-fuel mixture in the intake manifold of the engine, wherein the controller is further configured to receive pressure data from the pressure sensor and temperature data from the temperature sensor, and to calculate a flow rate of an air component of the air-fuel mixture using the pressure data and the temperature data of the air-fuel mixture, the flow rate of the air component corresponding to the flow rate of the intake air including the methane.

16. The system of claim 14, further comprising:

a fuel flow rate sensor disposed at a location along a fuel intake line prior to the intake air and the main fuel having been mixed;

wherein the controller is further configured to:

receive flow rate data of the main fuel measured by the fuel flow rate sensor;

determine a flow rate of the intake air required for combustion of combined fuel comprising the main fuel mixed with the supplemental fuel;

determine an excess air fraction representative of an amount of air provided to the engine in excess of the flow rate of intake air required for combustion; and calculate the flow rate of the intake air flowing to the engine using the flow rate of the intake air required for combustion and the excess air fraction.

17. The system of claim 16, wherein the controller is configured to determine the flow rate of the intake air used for combustion of the combined fuel by:

determining a flow rate of the intake air required to combust each constituent of the combined fuel; and summing the determined flow rates of the intake air required to combust the constituents of the combined fuel.

18. The system of claim 16, further comprising:

an exhaust gas sensor for measuring a flow rate of exhaust gas produced by combustion of the intake air, wherein the controller is configured to receive flow rate data of the exhaust gas from the exhaust gas sensor for determination of the flow rate of intake air used for combustion of the combined fuel.

19. The system of claim 16, further comprising:

an oxygen sensor for measuring an oxygen fraction of exhaust gas, wherein the controller is configured to receive exhaust oxygen fraction data of the exhaust gas from the oxygen sensor for determination of the excess air fraction.

20. The system of claim 16, further comprising:

a pressure sensor for measuring a pressure of an air-fuel mixture in an intake manifold of the engine, the air-fuel mixture being a mixture of the intake air and the combined fuel; and a temperature sensor for measuring a temperature of the air-fuel mixture in the intake manifold of the engine, wherein the controller is configured to:

receive pressure data from the pressure sensor;

receive temperature data from the temperature sensor; and calculate the excess air fraction using flow rate data of the main fuel fuel, a composition of the combined fuel, the pressure data, and the temperature data.

* * * * *